(12) United States Patent
Uhlendorf et al.

(10) Patent No.: US 11,054,630 B2
(45) Date of Patent: Jul. 6, 2021

(54) CAMERA LENS SYSTEM FOR AN ENDOSCOPE, METHOD FOR PRODUCING A CAMERA LENS SYSTEM AND AN ENDOSCOPE

(71) Applicant: Jabil Optics Germany GmbH, Jena (DE)

(72) Inventors: Kristina Uhlendorf, Jena (DE); David Musick, Jena (DE)

(73) Assignee: Jabil Optics Germany GmbH, Jena (DE)

(*) Notice: Subject to any disclaimer, the term of this patent is extended or adjusted under 35 U.S.C. 154(b) by 201 days.

(21) Appl. No.: 16/507,618

(22) Filed: Jul. 10, 2019

(65) Prior Publication Data
US 2020/0057296 A1 Feb. 20, 2020

(30) Foreign Application Priority Data
Aug. 16, 2018 (EP) .................................. 18189261

(51) Int. Cl.
| G02B 23/24 | (2006.01) |
| G02B 9/12 | (2006.01) |
| G02B 13/18 | (2006.01) |
| G02B 13/00 | (2006.01) |
| G02B 13/04 | (2006.01) |

(52) U.S. Cl.
CPC ............ *G02B 23/243* (2013.01); *G02B 9/12* (2013.01); *G02B 13/18* (2013.01); *G02B 13/0035* (2013.01); *G02B 13/04* (2013.01)

(58) Field of Classification Search
CPC .... G02B 13/0035; G02B 13/04; G02B 13/18; G02B 9/12; G02B 23/243

USPC ................ 359/716, 753, 762, 770, 781, 783
See application file for complete search history.

(56) References Cited

U.S. PATENT DOCUMENTS

| 5,175,650 | A | * | 12/1992 | Takayama ............ G02B 23/243 359/644 |
| 6,795,253 | B2 | | 9/2004 | Shinohara |
| 6,905,462 | B1 | * | 6/2005 | Homma ............. G02B 23/2484 359/363 |
| 7,394,602 | B2 | | 7/2008 | Chen et al. |
| 7,408,725 | B2 | | 8/2008 | Sato |
| 7,468,847 | B2 | | 12/2008 | Tang |
| 9,468,358 | B2 | * | 10/2016 | Harada .............. A61B 1/00096 |

(Continued)

FOREIGN PATENT DOCUMENTS

| KR | 2015/0033321 A | 4/2015 |
| WO | 2017068726 A1 | 4/2017 |

*Primary Examiner* — Evelyn A Lester
(74) *Attorney, Agent, or Firm* — Young Basile Hanlon & MacFarlane, P.C.

(57) ABSTRACT

Camera lens system for an endoscope, method for producing same and endoscope. The system includes at least three lenses. Starting from object side, first lens is a negative lens, and lenses moving toward an image side are positive lenses, with features: $45<V1d<75$; $|V1d-V2d|<10$; $|V1d-V3d|<10$; $|V2d-V3d|<10$; $1.45<n1d<1.75$; $|n1d-n2d|<0.1$; $|n1d-n3d|<0.1$; $|n2d-n3d|<0.1$; diagonal field of view from $80°-100°$; $0.4<f<0.7$; $-3<f1/f<-2$; $1.1<f2/f<1.3$; $2.5<f3/f<3.5$, the three lenses having V1d, V2d, and V3d Abbe numbers, n1d, n2d, and n3d refractive indices, f1, f2, and f3 focal lengths, respectively, and f is focal length of the objective of the system.

14 Claims, 10 Drawing Sheets

(56) References Cited

U.S. PATENT DOCUMENTS

| | | | |
|---|---|---|---|
| 9,798,115 B1 | 10/2017 | Yin et al. | |
| 10,634,884 B2 * | 4/2020 | Takada | G02B 1/041 |
| 2008/0080065 A1 * | 4/2008 | Asami | G02B 13/0035 |
| | | | 359/716 |
| 2009/0161234 A1 | 6/2009 | Sasamoto | |
| 2012/0250165 A1 * | 10/2012 | Do | G02B 13/18 |
| | | | 359/715 |
| 2013/0222675 A1 | 8/2013 | Kubota et al. | |
| 2013/0222927 A1 | 8/2013 | Kubota et al. | |
| 2013/0278714 A1 * | 10/2013 | Hirose | G02B 13/06 |
| | | | 359/716 |
| 2015/0029602 A1 | 1/2015 | Kubota et al. | |
| 2015/0029603 A1 | 1/2015 | Kubota et al. | |
| 2018/0149843 A1 | 5/2018 | Tung et al. | |
| 2018/0307010 A1 * | 10/2018 | Amanai | G02B 13/04 |
| 2018/0364456 A1 * | 12/2018 | Kubota | G02B 13/0045 |
| 2018/0373018 A1 * | 12/2018 | Katakura | G02B 9/12 |

* cited by examiner

CAMERA LENS SYSTEM FOR AN ENDOSCOPE, METHOD FOR PRODUCING A CAMERA LENS SYSTEM AND AN ENDOSCOPE

CROSS-REFERENCE TO RELATED APPLICATION(S)

This application claims priority to and the benefit of European Patent Application No. 18189261.3 filed Aug. 16, 2018, the entire disclosure of which is hereby incorporated by reference.

TECHNICAL FIELD

The invention relates to a camera lens system for an endoscope, method for producing a camera lens system and an endoscope.

BACKGROUND

In the field of endoscopy, camera modules are required to fit in a small volume in order to minimize the invasiveness of an operation. Some technological processes like wafer level optics limit the variety of materials which can be implemented in the optical design of the system. Despite the limitation in available materials, good optical performance, particularly the color correction, is still required.

Current solutions of endoscopic objective use at least two different materials to achieve sufficient performance and therefore results in a limitation concerning the chosen technology. For example technologies like wafer level optics are unlikely used for such cases and therefore cannot benefit from related advantages of improved production costs and an optimized size of the resulting system.

The document KR 2015/0033321 A1 discloses a wide-angle photographic lens system. This system enables a correction of distortions and comprises three lenses. The first lens has a weak refractivity, the second lens has a strong positive refractivity and the third lens has a negative refractivity. Furthermore, the system satisfies the following relations: $|f1/fl|>2.8$, $f2/f<1$, and $te/tc<0.4$, wherein f1 is a focal length of the first lens, f is a total focal length of all lenses, f2 is a focal length of the second lens, te is a lens thickness on an effective diameter of a rear surface of the second lens, and tc is a center thickness of the second lens.

The document U.S. Pat. No. 6,795,253 B2 discloses an imaging lens. This imaging lens includes, in order from the object side, a positive meniscus first lens component with its convex lens surface on the object side, a positive meniscus second lens component with its convex lens surface on the image side and a negative third lens component with its concave lens surface on the image side.

The document U.S. Pat. No. 7,394,602 B2 discloses an optical system for taking an image. This optical system comprises three lens elements with refractive power, from the object side to the image side: a first positive lens element having a convex front surface and a concave rear surface, and the front surface being aspheric, a negative plastic second lens element having a concave front surface and a convex rear surface, and the front and rear surfaces thereof being aspheric, a positive plastic third lens element having a convex front surface and a concave rear surface, the front and rear surfaces thereof being aspheric, and an aperture stop located between the first and second lens elements for controlling brightness of the optical system.

The document U.S. Pat. No. 7,408,725 B2 discloses a single focus lens. This single focus lens provides and includes, in order from an object side of the single focus lens, a first lens having positive power and having a convex surface on the object side, a second lens of a negative meniscus lens and having a concave surface of the object side on its paraxial axis and a third lens of an aspherical lens having a convex surface on the object side on its paraxial axis.

The document U.S. Pat. No. 7,468,847 B2 discloses an optical lens system for taking an image. This optical lens system comprises three lens elements with refractive power, from the object side to the image side: a first positive lens element having a convex surface on the object side and a concave surface on the image side, and at least one of the object side and image-side surfaces being aspheric, a negative plastic second lens element having a concave surface on the object side and a convex surface on the image side, and the object-side and image-side surfaces thereof being aspheric, a positive plastic third lens element having a convex surface on the object side and a concave surface on the image side, the object-side and image-side surfaces thereof being aspheric and an aperture stop located in front of the first lens element for controlling brightness of the optical lens system. A focal length of the second lens element is f2, a focal length of the optical lens system is f and they satisfy the relation: $0.1<|f/f2|<0.74$.

The document US 2013/0222675 A1 discloses an imaging lens and imaging device. This imaging lens includes a first lens, a second lens and a third lens arranged from an object side to an image plane side. The first lens has an object-side surface with a positive curvature radius. The second lens has an object-side surface and an image plane-side surface with negative curvature radii. The third lens has an object-side surface and an image plane-side surface with positive curvature radii. The object-side surface and the image plane-side surface of the third lens are respectively formed as an aspheric shape having an inflexion point. When the whole lens system has a focal length f, the first lens has a focal length f1, the second lens has a focal length f2, and the third lens has a focal length f3, the imaging lens satisfies the following conditional expressions: $f1<f2$ $1.0<f1/f<1.5$ $0.7<f2/f3<1.2$.

The document US 2013/0222927 A1 discloses an imaging lens and imaging device. The imaging lens includes a first lens, a second lens and a third lens arranged from an object side to an image plane side. The first lens has an object-side surface having a positive curvature radius R1f and an image plane-side surface having a negative curvature radius R1r. The second lens has an object-side surface and an image plane-side surface with negative curvature radii. The third lens has an object-side surface and an image plane-side surface with positive curvature radii and formed as aspheric surfaces having inflexion points. When the whole lens system has a focal length f, the first lens has a focal length f1, the second lens has a focal length f2, and the third lens has a focal length f3, the imaging lens satisfies the following conditional expressions: $f1<f2<f3$ $1.0<f1/f<1.5$ $-0.02<R1f/R1r<0$.

The document US 2015/0029602 A1 discloses an imaging lens. The imaging lens includes a first lens having positive refractive power, a second lens having positive refractive power; and a third lens having negative refractive power, arranged in the order from an object side to an image plane side. The first lens and the third lens respectively have an object-side surface and an image plane-side surface whose curvature radii are both positive. The second lens has an image plane-side surface whose a curvature radius is negative. In addition, when the first lens has refractive power P1, the second lens has refractive power P2, the third lens has refractive power P3, the curvature radius of the image plane-side surface of the second lens is R2r, and the curvature radius of the object-side surface of the third lens is R3f, the imaging lens satisfies specific conditional expressions.

The document US 2015/0029603 A1 discloses an imaging lens. The imaging lens includes a first lens having positive refractive power, a second lens having positive refractive power and a third lens having positive refractive power, arranged in the order from an object side to an image plane side. The first lens and the third lens have object-side surfaces and image plane-side surfaces, curvature radii of which are both positive. When the first lens has refractive power P1, the second lens has refractive power P2, the third lens has refractive power P3, the first lens has a focal length f1, and the third lens has a focal length f3, the imaging lens satisfies the following conditional expressions: $5.0<(P1+P3)/P2<8.5$ $6<f3/f1<30$.

There is a desire for a steady improvement in the cost structure associated with such systems or parts of such systems and an effort to steadily reduce such systems regarding the overall size as well as the sizes of the single parts provided within the system.

It is therefore an object of the presented invention to provide a camera lens system for an endoscope which provides a better cost structure and an improved performance concerning the size of the system.

SUMMARY

In a preferred embodiment of the invention it is provided that a camera lens system for an endoscope comprises the following components: At least three lenses, wherein the first lens, when starting from the object side, is a negative lens, the following lenses moving toward the image side are positive lenses, wherein the system comprises the following features: $45<V1d<75$; $|V1d-V2d|<10$; $|V1d-V3d|<10$; $|V2d-V3d|<10$; $1.45<n1d<1.75$; $-n2d|<0.1$; $|n1d-n3d|<0.1$; $|n2d-n3d|<0.1$; $0.4<f<0.7$; $-3<f1/f<-2$; $1.1<f2/f<1.3$; $2.5<f3/f<3.5$, wherein V1d, V2d and V3d are the Abbe numbers of the first, second and third lens respectively, n1d, n2d and n3d are the refractive indices of the first, second and third lens respectively, f is the focal length of the objective of the system, f1, f2 and f3 are the focal lengths of the first, second and third lens respectively. The invention with the presented components allows a cost-effective production, as well as an improved performance concerning the size of the system. In addition, the invention provides good optical performances, especially for the usage within the technical field of endoscopy. The camera lens system can also be a miniature camera system. Preferably a diagonal field of view ranges from 80 to 100 degrees, more preferably from 88 to 92 degrees.

Further preferred embodiments of the invention will become apparent from the remaining features mentioned in the sub claims. In a preferred embodiment, said three lenses are formed from the same material. In a more preferred embodiment, said three lenses completely consist of the same material. Technologies like wafer level optics can therefore be used for manufacturing such an optical system resulting in improved production costs and an optimized size of the resulting system.

According to a preferred embodiment of the invention, the three lenses are arranged along an optical axis which forms a straight line. It is further preferred that all three lenses are formed to be symmetrical to the rotation axis (optical axis). It is further preferred that no further components (changing the optical properties of the lens system) intervene said three lenses. It is further preferred that air (or another gas) fills the gaps between said lenses.

According to a preferred embodiment of the invention, the first lens is formed such that the condition $50<V1d<65$ is met. According to a preferred embodiment of the invention, the first lens is formed such that the condition $50<V1d<55$ is met.

According to a preferred embodiment of the invention, at least one of the following conditions is met:

$|V1d-V2d|<5$; $|V1d-V3d|<5$; $|V2d-V3d|<5$.

According to a preferred embodiment of the invention, the first lens is formed such that the condition $1.45<n1d<1.65$ is met. According to a preferred embodiment of the invention, the first lens is formed such that the condition $1.50<n1d<1.55$ is met.

According to a preferred embodiment of the invention, at least one of the following conditions is met:

$|n1d-n2d|<0.05$; $-n3d|<0.05$; $|n2d-n3d|<0.05$.

According to a preferred embodiment of the invention, at least one of the following conditions is met:

$-2.75<f1/f<-2.25$; $1.15<f2/f<1.25$; $2.75<f3/f<3.25$.

According to a preferred embodiment of the invention, at least one of the following conditions is met:

$0.05<$thickness of first lens$<0.3$ $0.05<$thickness of second lens$<0.3$ $0.05<$thickness of third lens$<0.3$.

According to a preferred embodiment of the invention, at least one of the following conditions is met:

$0.1<$thickness of first lens$<0.2$ $0.1<$thickness of second lens$<0.2$ $0.1<$thickness of third lens$<0.2$.

According to a preferred embodiment of the invention, at least one of the following conditions is met: $0.05<$distance between first lens and second lens$<0.3$ $0.05<$distance between second lens and third lens$<0.3$ According to a preferred embodiment of the invention, at least one of the following conditions is met:

$0.1<$distance between first lens and second lens$<0.2$ $0.1<$distance between second lens and third lens$<0.2$.

According to a preferred embodiment of the invention, a distance between the third lens and a cover glass ranges between 0.1 and 0.3, more preferably between 0.12 and 0.24. Preferably, the cover glass has a thickness between 0.6 and 0.2, more preferably between 0.5 and 0.3.

If not defined otherwise in this application, the thickness of the lens(es) is measured along the rotational axis. If not defined otherwise in this application, a distance between lenses is measured along the rotational axis. If not defined otherwise, all values for length/distance/thickness/radius/focal length or the like in this application are millimeters.

In a further preferred embodiment of the invention, all three lenses are formed to be axially (rotationally) symmetrical. In a further preferred embodiment of the invention, all three lenses are positioned along a common axis (straight line) which represents the rotational axis of the system.

In a further preferred embodiment of the invention, it is provided that the first lens, when starting from the object side, is a negative lens, the following lenses moving toward the image side are positive lenses, an aperture is positioned between the first an the second lenses and all lenses are made of the same material. By using the same material for all lenses, it is possible to use technologies like wafer level optics. This improves the advantages concerning costs and size, which are even better achieved. Current solutions of endoscopic objective use at least two different materials to achieve sufficient performance and are therefore more cost intensive and often cannot provide ideal sizes.

In a further preferred embodiment of the invention, it is provided that the camera lens system utilizes a diagonal field of view of 90 degrees and an f-number of 5.0. This combination of features make sure that even better results are achievable when using the presented camera lens system.

Figure 2:
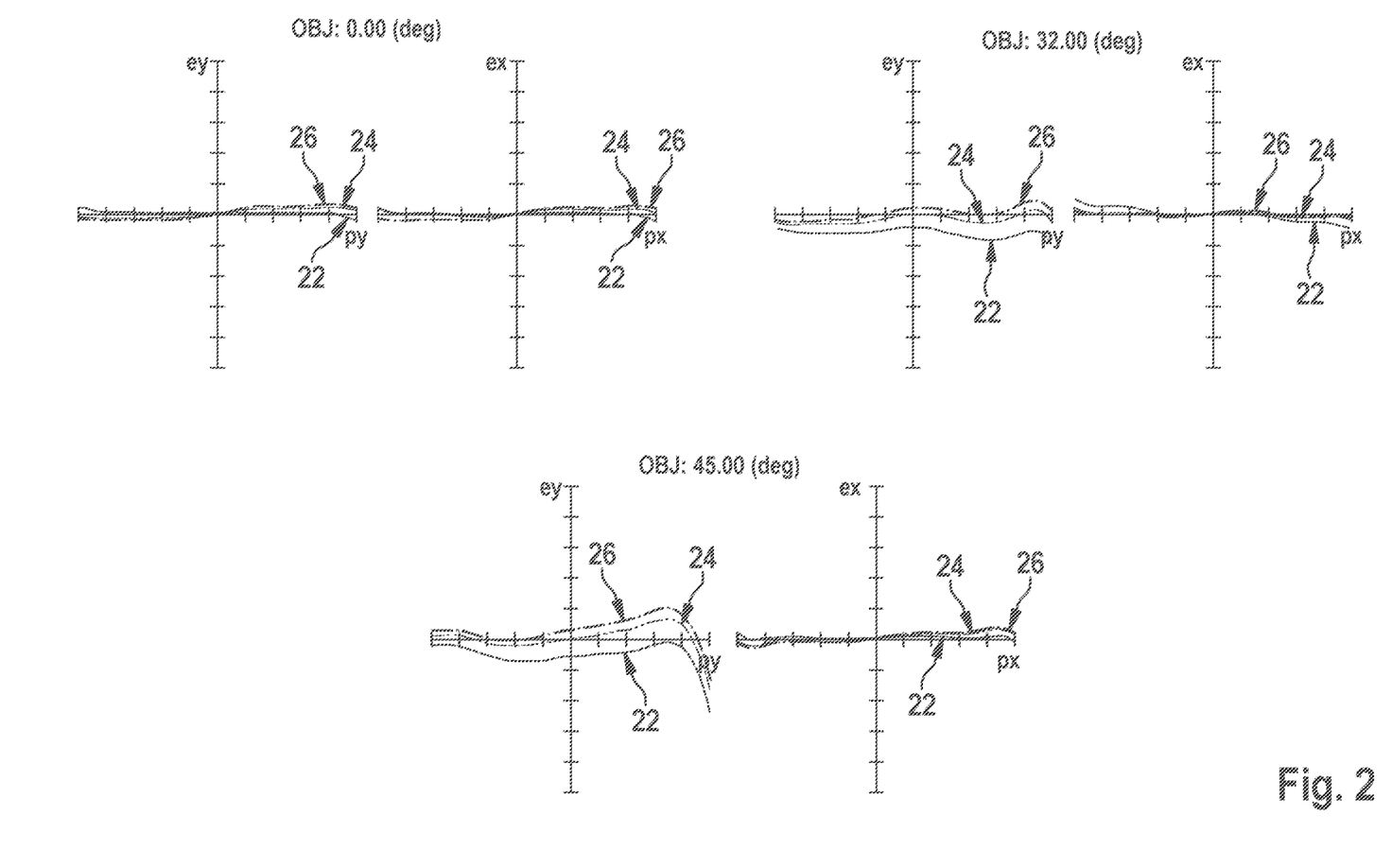
FIG. 2 shows transverse ray aberrations for embodiment 1.
Figure 3:
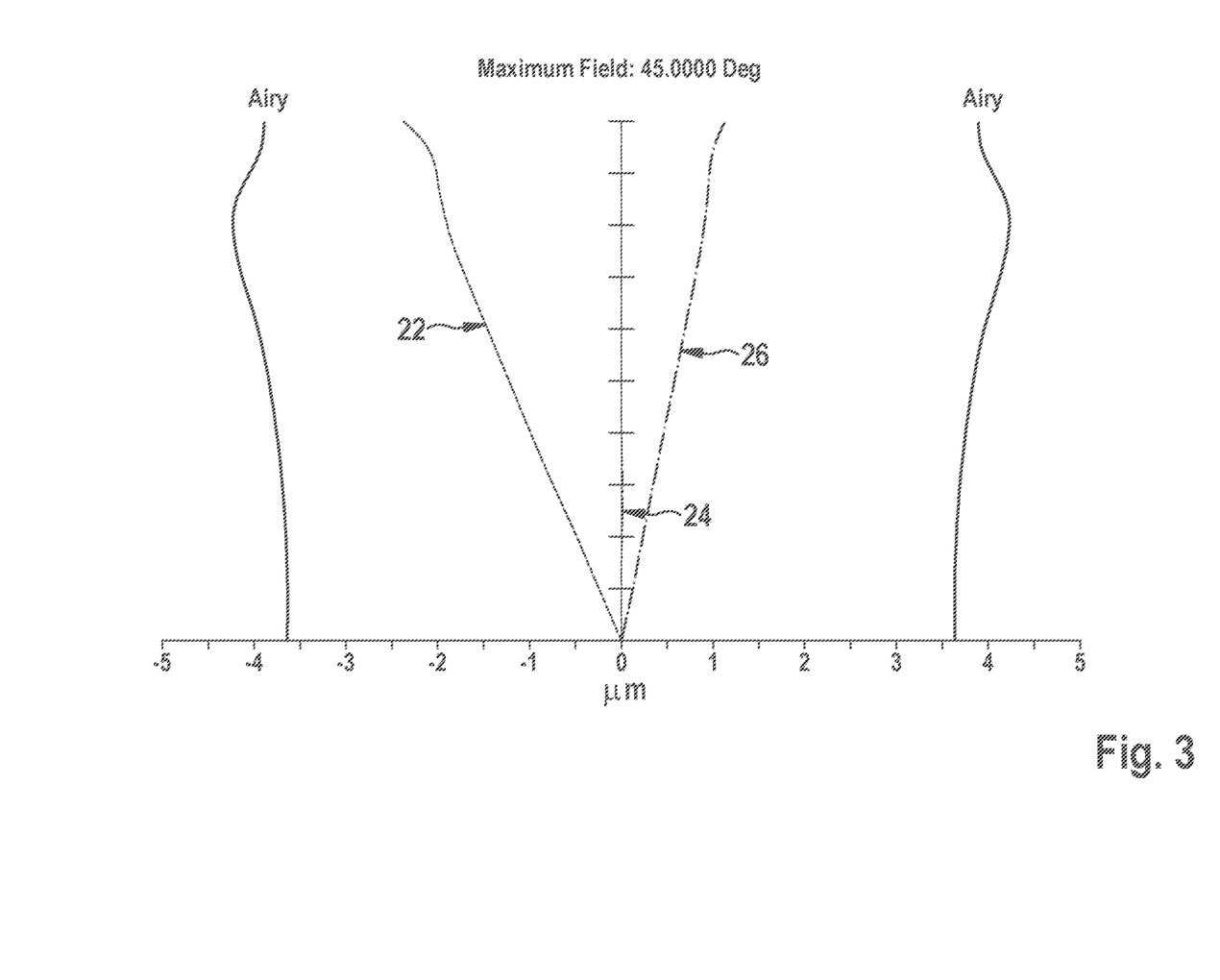
FIG. 3 shows lateral color aberration for embodiment 1.

In a further preferred embodiment of the invention, it is provided that the system has a focal length of f=0.5299 mm, the first lens is a meniscus lens, which is convex on the object side, and has a focal length of f1=−1.448 mm, the second lens is a meniscus lens, which is convex on the image side, and has a focal length of f2=0.6408 mm and the third lens is an aspheric lens, which is paraxial convex on the object side with a transition to being convex on the image side at a larger distance from the optical axis, and has a focal length of f3=1.665 mm. The resulting performance is shown in FIGS. 2 and 3 for wavelengths 486, 587 and 656 nm. The good chromatic aberration correction, as shown in FIG. 2, helps to achieve minimal ray aberrations across the field as shown in FIG. 3. An overview of the lens description can also be seen below in table 2. This leads to relative focal lengths of f1/f=−2.733, f2/f=1.209 and f3/f=3.141. In addition, an overview of the aspherical coefficients can be seen below in table 5.

Figure 5:
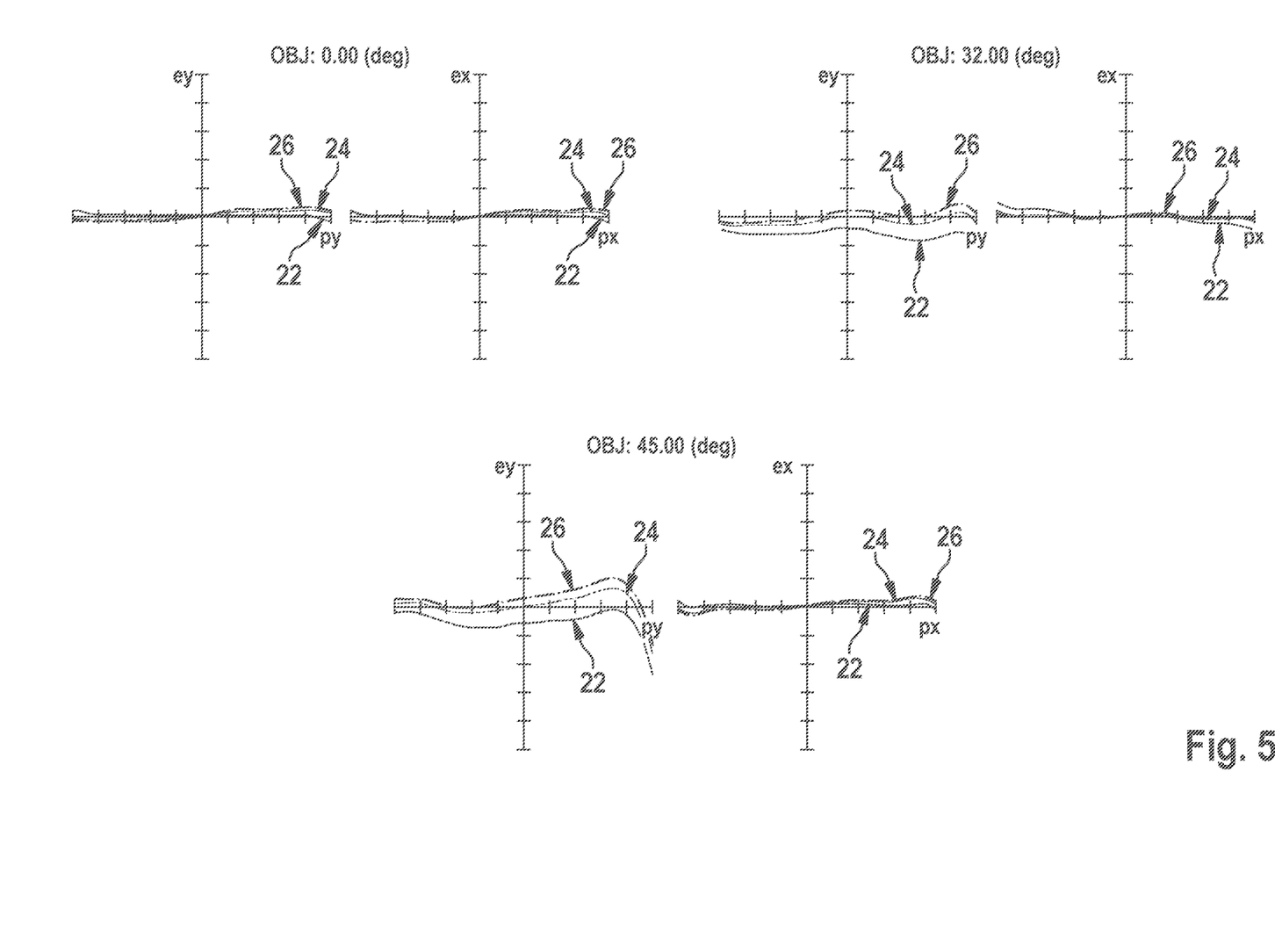
FIG. 5 shows transverse ray aberrations for embodiment 2.
Figure 6:
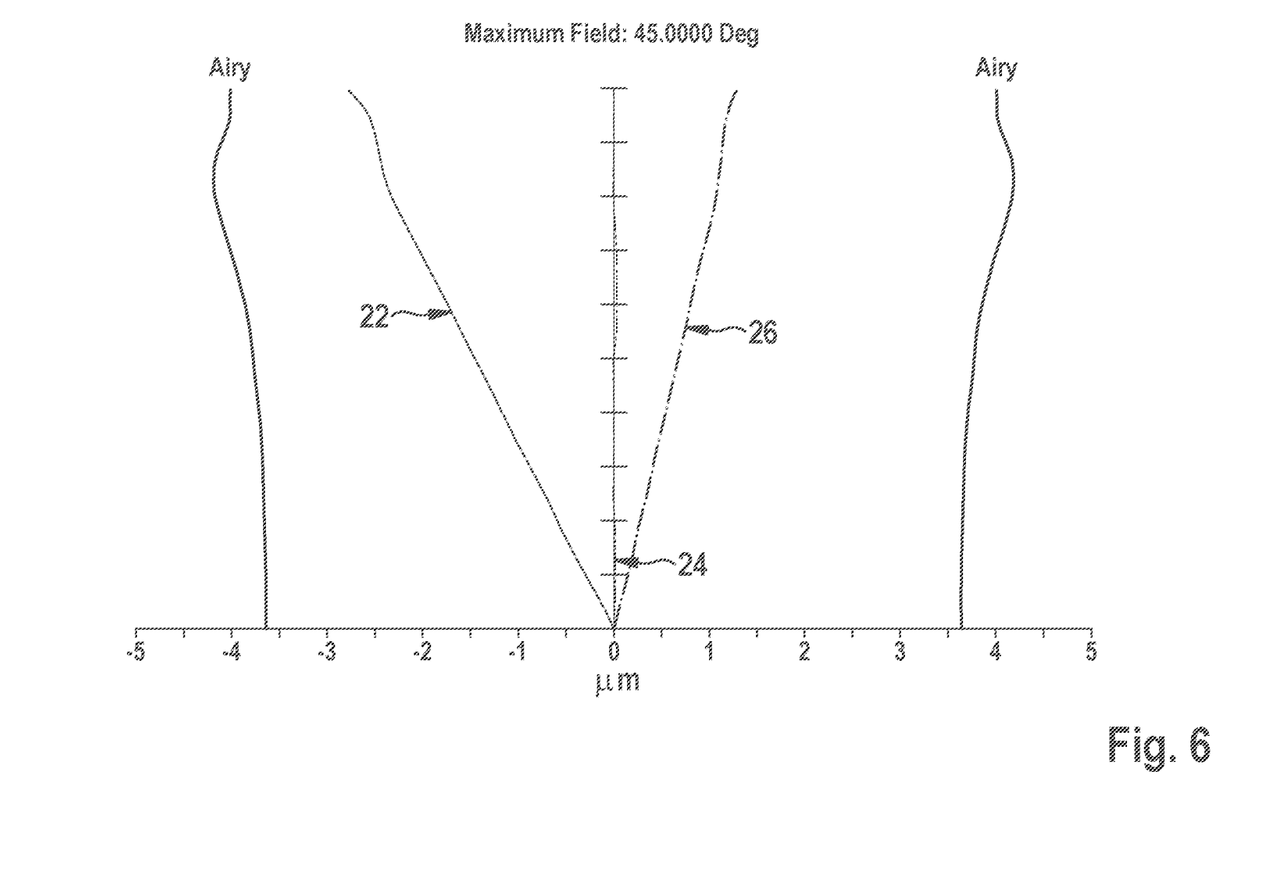
FIG. 6 shows lateral color aberration for embodiment 2.

In a further preferred embodiment of the invention, it is provided that the system has a focal length of f=0.5310 mm, the first lens is a meniscus lens, which is convex on the object side, and has a focal length of f1=−1.397 mm, the second lens is a meniscus lens, which is convex on the image side, and has a focal length of f2=0.6400 mm and the third lens is an aspheric lens, which is paraxial convex on the object side with a transition to being convex on the image side at a larger distance from the optical axis, and has a focal length of f3=1.652 mm and the system comprises a standard cover glass for a sensor. The performance of this embodiment is shown in FIGS. 5 and 6 for wavelengths 486, 587 and 656 nm. The well-corrected lateral color aberration shown in FIG. 6 helps to provide well-corrected transverse ray aberrations as shown in FIG. 5. The focal lengths correspond to relative focal lengths of f1/f=−2.631, f2/f=1.205 and f3/f=3.112. An overview of the lens description can also be seen below in table 3. In addition, an overview of the aspherical coefficients can be seen below in table 6. The incorporated standard cover glass for a sensor provides a protection function for the lenses so that a robust and reliable system can be achieved.

Figure 8:
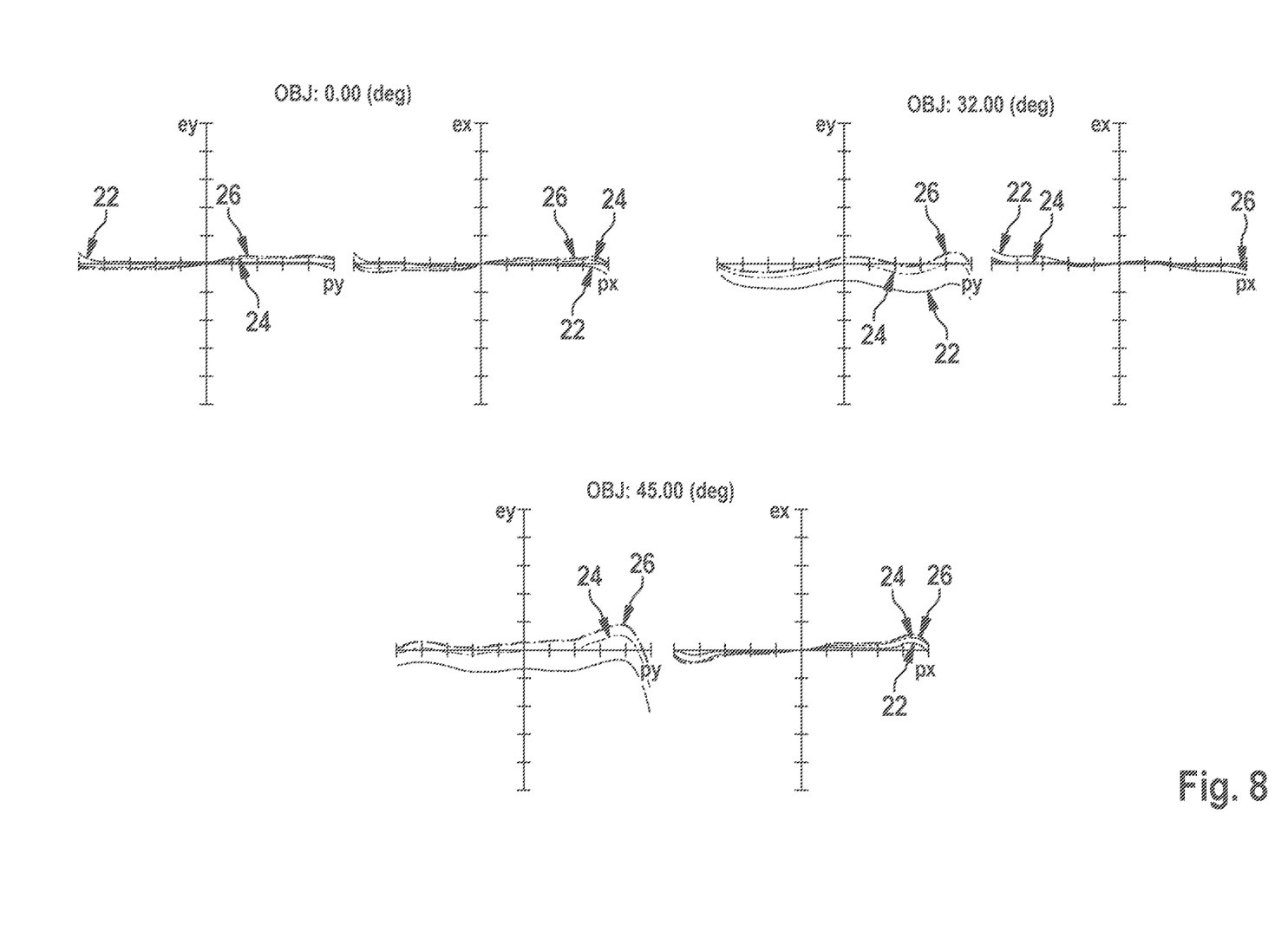
FIG. 8 shows transverse ray aberrations for embodiment 3.
Figure 9:
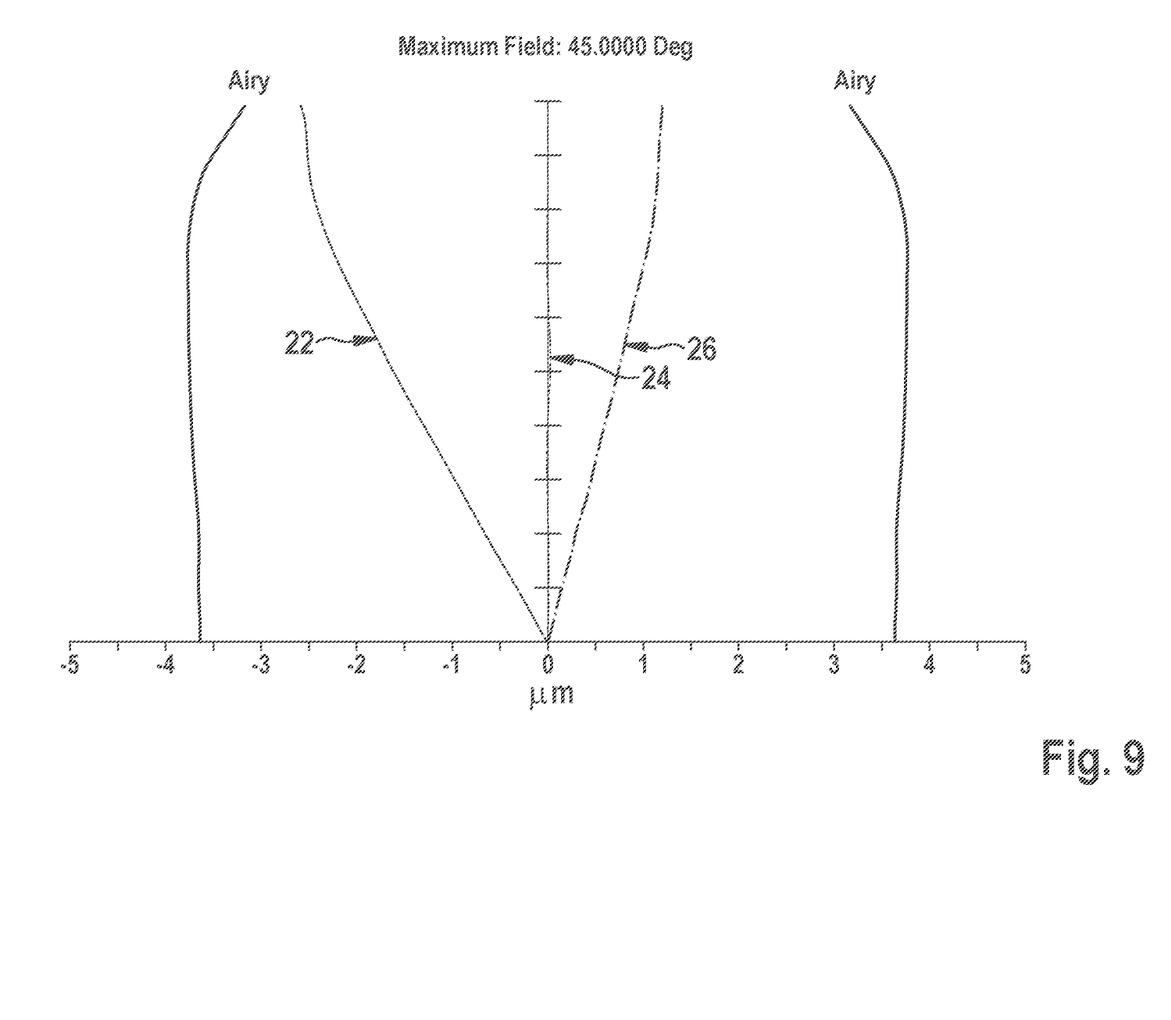
FIG. 9 shows lateral color aberration for embodiment 3.

In a further preferred embodiment of the invention, it is provided that the system has a focal length of f=0.5821 mm, the first lens is a meniscus lens, which is convex on the object side, and has a focal length of f1=−1.423 mm, the second lens is a meniscus lens, which is convex on the image side, and has a focal length of f2=0.7132 mm and the third lens is an aspheric lens, which is paraxial convex on the object side with a transition to being convex on the image side at a larger distance from the optical axis, and has a focal length of f3=1.715 mm and the system comprises a standard cover glass for a sensor. These focal lengths correspond to relative focal lengths of f1/f=−2.445, f2/f=1.225 and f3/f=2.947. The performance is shown in FIGS. 8 and 9. An overview of the lens description can also be seen below in table 4. In addition, an overview of the aspherical coefficients can be seen below in table 7. The incorporated standard cover glass for a sensor provides a protection function for the lenses so that a robust and reliable system can be achieved.

In a further preferred embodiment of the invention, it is provided that the standard cover glass for a sensor is positioned between the third lens and the image side. In this way it is possible to provide good performance concerning the size of the presented system for various sensor configurations.

In a further preferred embodiment of the invention, it is provided that a distance between the third lens and the standard cover glass for a sensor is bigger than a distance between the first lens and the second lens and/or bigger than a distance between the second lens and the third lens.

This additional space can be utilized in alignment processes to protect the lens and cover glass from damaging one another during assembly, or to adjust the optical parameters of the lens.

In a further preferred embodiment of the invention, it is provided that a method for producing a camera lens system according to one of the preceding claims, comprises the following steps: providing a single material, producing at least three lenses, composing the at least three lenses so that the camera lens system is achieved, wherein the first lens, when starting from the object side, is a negative lens, the following lenses moving toward the image side are positive lenses, wherein the system comprises the following features: 45<V1d<75, |V1d−V2d|<10, |V1d−V3d|<10, |V2d−V3d|<10, 1.45<n1d<1.75, |n1d−n2d|<0.1, |n1d−n3d|<0.1, |n2d−n3d|<0.1, 0.4<f<0.7, −3<f1/f<−2, 1.1<f2/f<1.3, 2.5<f3/f<3.5, wherein V1d, V2d and V3d are the Abbe numbers of the first, second and third lens respectively, n1d, n2d and n3d are the refractive indices of the first, second and third lens respectively, f is the focal length of the objective of the system, f1, f2 and f3 are the focal lengths of the first, second and third lens respectively. The advantages mentioned above apply in the same way to the presented method.

Finally, in a further preferred embodiment of the invention, it is provided that an endoscope comprises at least one camera lens system according to one of the claims 1 to 8. The advantages mentioned above apply in the same way to the presented endoscope.

A comparison of the present three preferred embodiments of the invention can be seen in table 1 below.

TABLE 1

Comparison of the three preferred embodiments

|  | Embodiment 1 | Embodiment 2 | Embodiment 3 |
| --- | --- | --- | --- |
| f | 0.5299 mm | 0.5310 mm | 0.5821 mm |
| f1 | −1.448 mm | −1.397 mm | −1.423 mm |
| f2 | 0.6408 mm | 0.6400 mm | 0.7132 mm |
| f3 | 1.665 mm | 1.652 mm | 1.715 mm |
| BFL | 0.4027 mm | 0.1320 mm | 0.2400 mm |
| f1/f | −2.733 | −2.631 | −2.445 |
| f2/f | 1.209 | 1.205 | 1.225 |
| f3/f | 3.141 | 3.112 | 2.947 |

An overview of the parameter description of the three variations is given in Tables 2-7. The surface sag, z, is given by $$z = \frac{r^2}{R*\left(1 + \sqrt{1 - \frac{(1+k)r^2}{R^2}}\right)} + a1r^2 + a2r^4 + a3r^6 + a4r^8$$

where r is the distance from the axis, R is the radius of curvature, k is the conic constant, and $a_n$ is the nth aspherical coefficient.

TABLE 2

Lens description for embodiment 1

| Surface | Radius | Thickness | nd | vd |
|---|---|---|---|---|
| Object | 0 | 5.5 | | |
| 1 | 4.10186207 | 0.16642131 | 1.507931 | 53.8125 |
| 2 | 0.61521869 | 0.11554587 | | |
| Stop | 0 | 0.01130894 | | |
| 4 | −1.23571647 | 0.1725685 | 1.507931 | 53.8125 |
| 5 | −0.26974506 | 0.17007553 | | |
| 6 | 0.30305173 | 0.15 | 1.507931 | 53.8125 |
| 7 | 0.39358507 | 0.40270978 | | |
| Image | | | | |

TABLE 3

Lens description for embodiment 2

| Surface | Radius | Thickness | nd | vd |
|---|---|---|---|---|
| Object | 0 | 5.5 | | |
| 1 | 14.683098 | 0.1714912 | 1.507931 | 53.8125 |
| 2 | 0.6742561 | 0.1142931 | | |
| Stop | 0 | 0.0113008 | | |
| 4 | −1.28429569 | 0.1622698 | 1.507931 | 53.8125 |
| 5 | −0.27046775 | 0.1735688 | | |
| 6 | 0.30306362 | 0.1500000 | 1.507931 | 53.8125 |
| 7 | 0.39524089 | 0.1319976 | | |
| 8 | 0 | 0.4000000 | 1.522385 | 64.1673 |
| 9 | 0 | 0.0100000 | | |
| Image | | | | |

TABLE 4

Lens description for embodiment 3

| Surface | Radius | Thickness | nd | vd |
|---|---|---|---|---|
| Object | 0 | 5.5 | | |
| 1 | 2.17177823 | 0.1536605 | 1.507931 | 53.8125 |
| 2 | 0.5294589 | 0.1193222 | | |
| Stop | 0 | 0.01243303 | | |
| 4 | −0.80668211 | 0.18626317 | 1.507931 | 53.8125 |
| 5 | −0.26944835 | 0.13432176 | | |
| 6 | 0.32401042 | 0.15 | 1.507931 | 53,\.8125 |
| 7 | 0.43537201 | 0.24 | | |
| 8 | 0 | 0.4 | 1.522385 | 64.1673 |
| 9 | 0 | 0.01 | | |
| Image | | | | |

TABLE 5

Aspherical coefficients for embodiment 1

| Surface | k | $a_1$ | $a_2$ | $a_3$ | $a_4$ |
|---|---|---|---|---|---|
| 1 | 0 | 0 | 13.3903755 | −52.5591927 | 332.350124 |
| 2 | 0 | 0 | 41.1446484 | 412.568112 | −10251.8046 |
| Stop | 0 | 0 | 0 | 0 | 0 |
| 4 | 0 | 0 | 38.9443385 | −20024.7566 | 2484306.2 |
| 5 | 0 | 0 | −30.7014234 | 532.005084 | −5708.68434 |
| 6 | 0 | 0 | −30.6896162 | 170.058242 | −1878.89654 |
| 7 | 0 | 0 | −18.2913389 | 79.7524751 | −477.709166 |

TABLE 6

Aspherical coefficients for embodiment 2

| Surface | k | $a_1$ | $a_2$ | $a_3$ | $a_4$ |
|---|---|---|---|---|---|
| 1 | 0 | 0 | 13.4287567 | −55.6713333 | 323.46834 |
| 2 | 0 | 0 | 39.9953966 | 429.854771 | −13265.3025 |
| Stop | 0 | 0 | 0 | 0 | 0 |
| 4 | 0 | 0 | 38.8577367 | −20077.6864 | 2463636.63 |
| 5 | 0 | 0 | −31.1690192 | 522.247905 | −4934.95751 |
| 6 | 0 | 0 | −29.8973214 | 171.010398 | −1945.79763 |
| 7 | 0 | 0 | −18.0478993 | 80.7056578 | −483.119338 |
| 8 | 0 | 0 | 0 | 0 | 0 |
| 9 | 0 | 0 | 0 | 0 | 0 |

TABLE 7

Aspherical coefficients for embodiment 3

| Surface | k | $a_1$ | $a_2$ | $a_3$ | $a_4$ |
|---|---|---|---|---|---|
| 1 | 0 | 0 | 12.3968892 | −29.7635134 | 247.550513 |
| 2 | 0 | 0 | 35.2512836 | 804.946509 | −14099.6553 |
| Stop | 0 | 0 | 0 | 0 | 0 |
| 4 | 0 | 0 | 34.9167636 | −16776.9258 | 1842848.37 |
| 5 | 0 | 0 | −28.3332338 | 392.547952 | −3936.98259 |
| 6 | 0 | 0 | −29.7061968 | 209.299165 | −1682.57956 |
| 7 | 0 | 0 | −16.1613339 | 74.4222303 | −420.842149 |
| 8 | 0 | 0 | 0 | 0 | 0 |
| 9 | 0 | 0 | 0 | 0 | 0 |

The various embodiments of the invention mentioned in this application are, unless otherwise stated in the individual case, advantageously combinable with each other.

BRIEF DESCRIPTION OF THE DRAWINGS

The invention will be explained below in embodiments with reference to the accompanying drawings. In these drawings.

DETAILED DESCRIPTION

Figure 1:
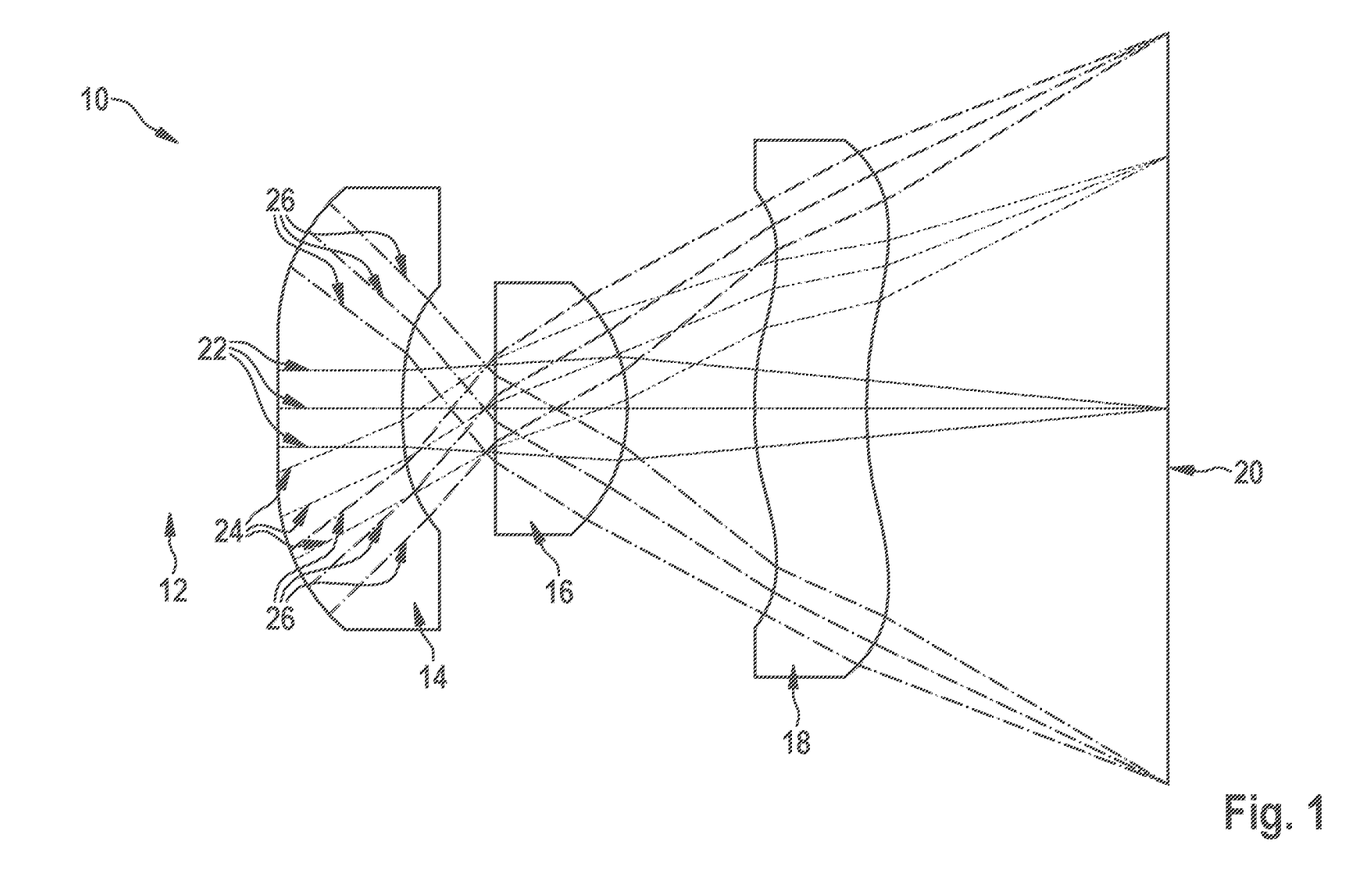
FIG. 1 is a view illustrating a camera lens system according to a first embodiment of the present invention.

FIG. 1 is a view illustrating a camera lens system 10 according to a first embodiment of the present invention. The object side 12 is on the left side related to the picture plane. A first lens 14 is shown on the left side, followed by a second lens 16 and a third lens 18. The image side 20 is on the right side related to the picture plane. For the lenses 14, 16 and 18 all features can be seen in the above illustrated tables 2-7. In addition, FIG. 1 illustrates pathways 22, 24 and 26 of light rays through the lens system. The shown size ratios of the individual elements and the distances between the individual elements to each other are shown only by way of example and may differ in variants, not shown. In a preferred embodiment, an aperture stop is arranged between the first lens 14 and the second lens 16 (not shown).

FIG. 2 shows transverse ray aberrations for embodiment 1. In addition, FIG. 2 illustrates the different pathways of light for different wavelengths: first wavelength (486 nm) 22, second wavelength (587 nm) 24 and third wavelength (656 nm) 26.

FIG. 3 shows lateral color aberration for embodiment 1. In addition, FIG. 3 illustrates the different pathways of light for different wavelengths: first wavelength (486 nm) 22, second wavelength (587 nm) 24 and third wavelength (656 nm) 26.

Figure 4:
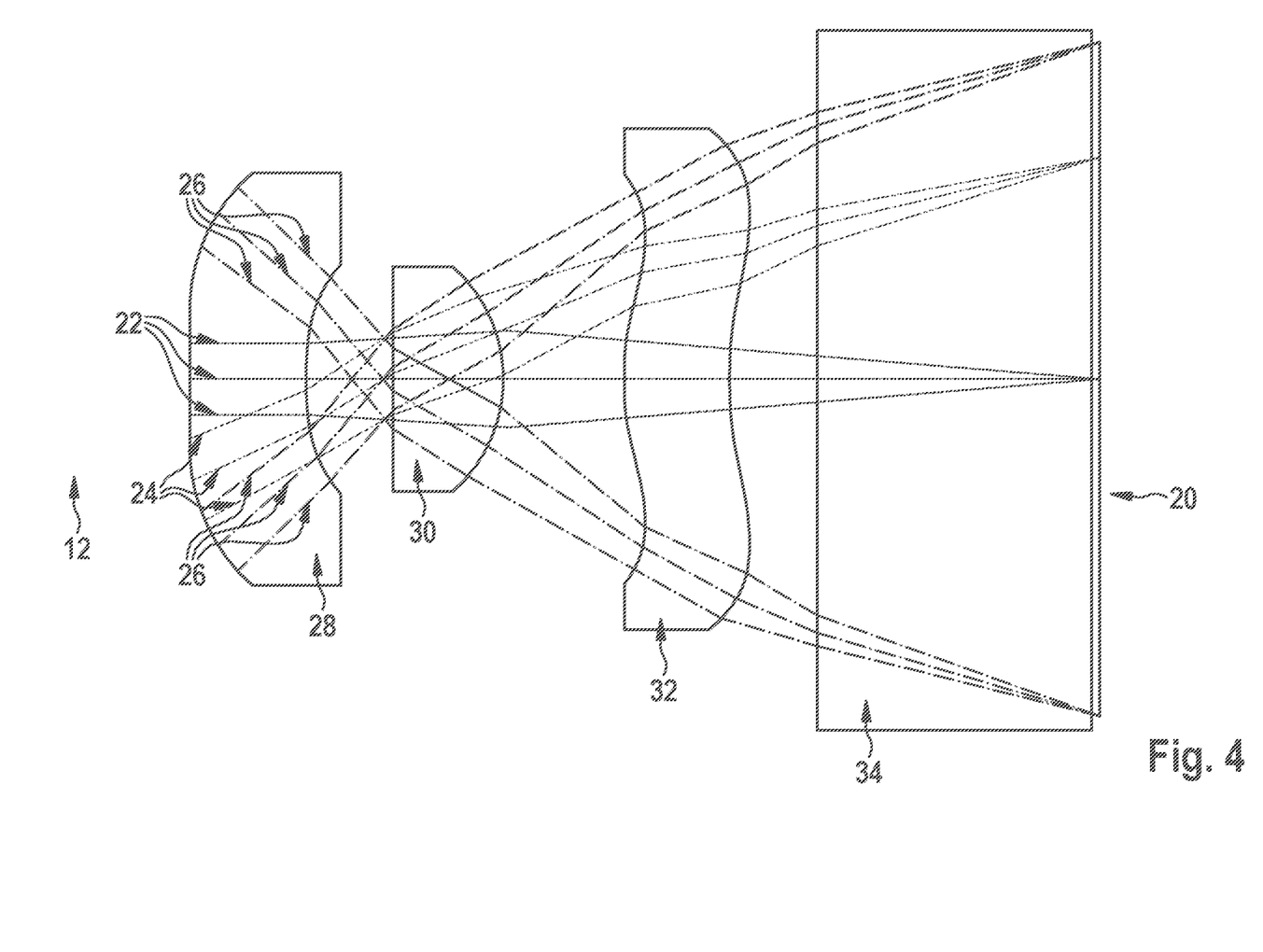
FIG. 4 is a view illustrating a camera lens system according to a second embodiment of the present invention.

FIG. 4 is a view illustrating a camera lens system according to a second embodiment of the present invention. The object side 12 is on the left side related to the picture plane. A first lens 28 is shown on the left side, followed by a second lens 30 and a third lens 32. The image side 20 is on the right side related to the picture plane. Between the third lens 32 and the image side 20 is shown a standard cover glass 34 for a sensor. For the lenses 28, 30 and 32 all features can be seen in the above illustrated tables 2-7. In addition, FIG. 4 illustrates different pathways 22, 24 and 26 for light rays through the lens system. The shown size ratios of the individual elements and the distances between the individual elements to each other are shown only by way of example and may differ in variants, not shown. In a preferred embodiment, an aperture stop is arranged between the first lens 14 and the second lens 16 (not shown).

FIG. 5 shows transverse ray aberrations for embodiment 2. In addition, FIG. 5 illustrates the different pathways of light for different wavelengths: first wavelength (486 nm) 22, second wavelength (587 nm) 24 and third wavelength (656 nm) 26.

FIG. 6 shows lateral color aberration for embodiment 2. In addition, FIG. 6 illustrates the different pathways of light for different wavelengths: first wavelength (486 nm) 22, second wavelength (587 nm) 24 and third wavelength (656 nm) 26.

Figure 7:
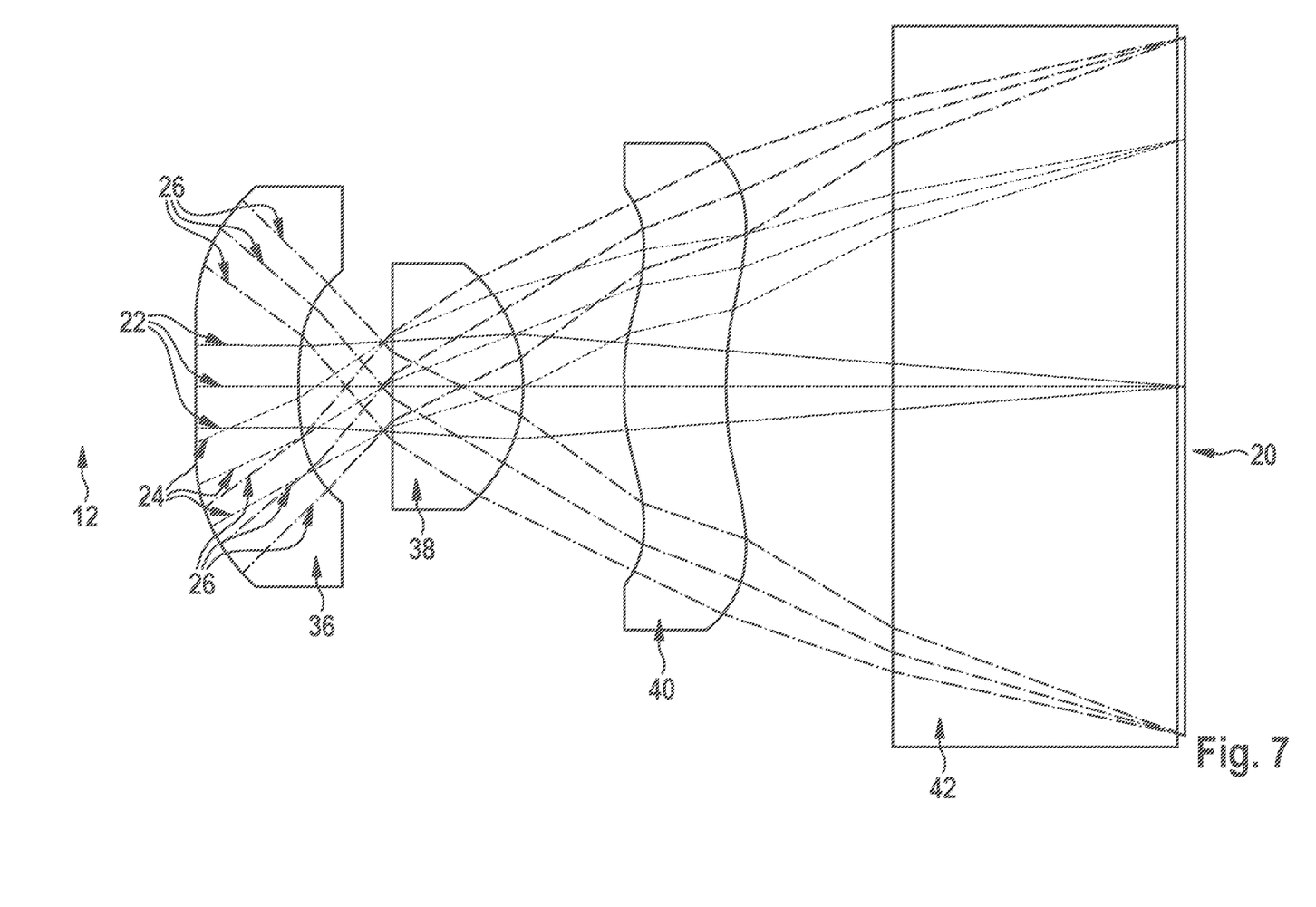
FIG. 7 is a view illustrating a camera lens system according to a third embodiment of the present invention.

FIG. 7 is a view illustrating a camera lens system according to a third embodiment of the present invention. The object side 12 is on the left side related to the picture plane. A first lens 36 is shown on the left side, followed by a second lens 38 and a third lens 40. The image side 20 is on the right side related to the picture plane. Between the third lens 40 and the image side 20 is shown a standard cover glass 42 for a sensor. For the lenses 36, 38 and 40 all features can be seen in the above illustrated tables 2-7. In addition, FIG. 7 illustrates the different pathways 22, 24 and 26 for light rays through the lens system. The shown size ratios of the individual elements and the distances between the individual elements to each other are shown only by way of example and may differ in variants, not shown. In a preferred embodiment, an aperture stop is arranged between the first lens 14 and the second lens 16 (not shown).

FIG. 8 shows transverse ray aberrations for embodiment 3.

FIG. 9 shows lateral color aberration for embodiment 3. In addition, FIG. 9 illustrates the different pathways of light for different wavelengths: first wavelength (486 nm) 22, second wavelength (587 nm) 24 and third wavelength (656 nm) 26.

Figure 10:
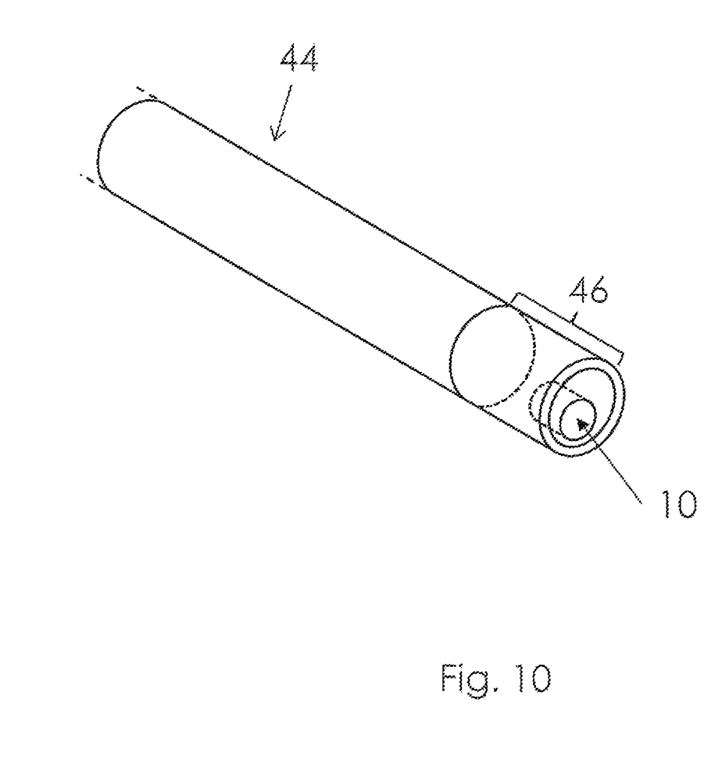
FIG. 10 shows a schematic endoscope with a camera lens system.

FIG. 10 shows a schematic endoscope 44 with a camera lens system 10. As can be see from FIG. 10, the camera lens system 10 according to the present invention is preferably arranged such to be located in the distal tip 46 of the endoscope 44.

LIST OF REFERENCE NUMBERS 10 camera lens system
12 object side
14 first lens
16 second lens
18 third lens
20 image side
22 first wavelength
24 second wavelength
26 third wavelength
28 first lens
30 second lens
32 third lens
34 standard cover glass
36 first lens
38 second lens
40 third lens
42 standard cover glass
44 endoscope
46 distal tip of endoscope

What is claimed is:

1. A camera lens system for an endoscope comprising at least three lenses, wherein the first lens, when starting from the object side, is a negative lens, the following lenses moving toward the image side are positive lenses, wherein the system comprises the following features:

a) $45 < V1d < 75;$ b) $|V1d - V2d| < 10;$ c) $|V1d - V3d| < 10;$ d) $|V2d - V3d| < 10;$ e) $1.45 < n1d < 1.75;$ f) $|n1d - n2d| < 0.1;$ g) $|n1d - n3d| < 0.1;$ h) $|n2d - n3d| < 0.1;$ i) $0.4 \text{ mm} \leq f < 0.7 \text{ mm};$ j) $-3 < f1/f < -2;$ k) $1.1 < f2/f < 1.3;$ l) $2.5 < f3/f < 3.5,$ wherein V1d, V2d and V3d are the Abbe numbers of the first, second and third lens respectively, n1d, n2d and n3d are the refractive indices of the first, second and third lens respectively, f is the focal length of the objective of the system, f1, f2 and f3 are the focal lengths in mm of the first, second and third lens respectively.

2. The camera lens system of claim 1, wherein at least two of said three lenses are formed of the same material.

3. The camera lens system of claim 2, wherein said three lenses are formed of the same material.

4. The camera lens system of claim 1, wherein the first lens, when starting from the object side, is a negative lens, the following lenses moving toward the image side are positive lenses, an aperture is positioned between the first and the second lenses.

5. The camera lens system of claim 1, wherein the lenses are formed such that a diagonal field of view ranges from 80 to 100 degrees.

6. The camera lens system of claim 1, wherein the system has a focal length of f=0.5299 mm, the first lens is a meniscus lens, which is convex on the object side, and has a focal length of f1=−1.448 mm, the second lens is a meniscus lens, which is convex on the image side, and has a focal length of f2=0.6408 mm and the third lens is an aspheric lens, which is paraxial convex on the object side with a transition to being convex on the image side at a larger distance from the optical axis, and has a focal length of f3=1.665 mm.

7. The camera lens system of claim 1, wherein the system has a focal length of f=0.5310 mm, the first lens is a meniscus lens, which is convex on the object side, and has a focal length of f1=−1.397 mm, the second lens is a meniscus lens, which is convex on the image side, and has a focal length of f2=0.6400 mm and the third lens is an aspheric lens, which is paraxial convex on the object side with a transition to being convex on the image side at a larger distance from the optical axis, and has a focal length of f3=1.652 mm and the system comprises a standard cover glass for a sensor.

8. The camera lens system of claim 1, wherein the system has a focal length of f=0.5821 mm, the first lens is a meniscus lens, which is convex on the object side, and has a focal length of f1=−1.423 mm, the second lens is a meniscus lens, which is convex on the image side, and has a focal length of f2=0.7132 mm and the third lens is an aspheric lens, which is paraxial convex on the object side with a transition to being convex on the image side at a larger distance from the optical axis, and has a focal length of f3=1.715 mm and the system comprises a standard cover glass for a sensor.

9. The camera lens system of claim 7, wherein the standard cover glass for a sensor is positioned between the third lens and the image side.

10. The camera lens system of claim 8, wherein a distance between the third lens and the standard cover glass for a sensor is bigger than a distance between the first lens and the second lens.

11. The camera lens system of claim 8, wherein a distance between the third lens and the standard cover glass for a sensor is bigger than a distance between the second lens and the third lens.

12. The camera lens system of claim 5, wherein the lenses are formed such that a diagonal field of view is 90 degrees.

13. A method for producing a camera lens system, comprising the following steps:
producing at least three lenses;
composing the at least three lenses so that the camera lens system is achieved, wherein the first lens, when starting from the object side, is a negative lens, the following lenses moving toward the image side are positive lenses, wherein the lenses are formed such to comply with the following conditions:

$$45 < V1d < 75; \quad\quad\quad\quad\quad \text{a)}$$

$$|V1d - V2d| < 10; \quad\quad\quad\quad\quad \text{b)}$$

$$|V1d - V3d| < 10; \quad\quad\quad\quad\quad \text{c)}$$

$$|V2d - V3d| < 10; \quad\quad\quad\quad\quad \text{d)}$$

$$1.45 < n1d < 1.75; \quad\quad\quad\quad\quad \text{e)}$$

$$|n1d - n2d| < 0.1; \quad\quad\quad\quad\quad \text{f)}$$

$$|n1d - n3d| < 0.1; \quad\quad\quad\quad\quad \text{g)}$$

$$|n2d - n3d| < 0.1; \quad\quad\quad\quad\quad \text{h)}$$

$$0.4 \text{ mm} \leq f < 0.7 \text{ mm}; \quad\quad\quad\quad\quad \text{i)}$$

$$-3 < f1/f < -2; \quad\quad\quad\quad\quad \text{j)}$$

$$1.1 < f2/f < 1.3; \quad\quad\quad\quad\quad \text{k)}$$

$$2.5 < f3/f < 3.5, \quad\quad\quad\quad\quad \text{l)}$$

wherein V1d, V2d and V3d are the Abbe numbers of the first, second and third lens respectively, n1d, n2d and n3d are the refractive indices of the first, second and third lens respectively, f is the focal length of the objective of the system, f1, f2 and f3 are the focal lengths in mm of the first, second and third lens respectively.

14. An endoscope comprising a camera lens system comprising at least three lenses, wherein the first lens, when starting from the object side, is a negative lens, the following lenses moving toward the image side are positive lenses, wherein the system comprises the following features:

$$45 < V1d < 75; \quad\quad\quad\quad\quad \text{a)}$$

$$|V1d - V2d| < 10; \quad\quad\quad\quad\quad \text{b)}$$

$$|V1d - V3d| < 10; \quad\quad\quad\quad\quad \text{c)}$$

$$|V2d - V3d| < 10; \quad\quad\quad\quad\quad \text{d)}$$

$$1.45 < n1d < 1.75; \quad\quad\quad\quad\quad \text{e)}$$

$$|n1d - n2d| < 0.1; \quad\quad\quad\quad\quad \text{f)}$$

$$|n1d - n3d| < 0.1; \quad\quad\quad\quad\quad \text{g)}$$

$$|n2d - n3d| < 0.1; \quad\quad\quad\quad\quad \text{h)}$$

$$0.4 \text{ mm} \leq f < 0.7 \text{ mm}; \quad\quad\quad\quad\quad \text{i)}$$

$$-3 < f1/f < -2; \quad\quad\quad\quad\quad \text{j)}$$

$$1.1 < f2/f < 1.3; \quad\quad\quad\quad\quad \text{k)}$$

$$2.5 < f3/f < 3.5, \quad\quad\quad\quad\quad \text{l)}$$

wherein V1d, V2d and V3d are the Abbe numbers of the first, second and third lens respectively, n1d, n2d and n3d are the refractive indices of the first, second and third lens respectively, f is the focal length of the objective of the system, f1, f2 and f3 are the focal lengths in mm of the first, second and third lens respectively.

* * * * *